(12) United States Patent
Wyland

(10) Patent No.: US 6,708,259 B1
(45) Date of Patent: Mar. 16, 2004

(54) PROGRAMMABLE WAKE UP OF MEMORY TRANSFER CONTROLLERS IN A MEMORY TRANSFER ENGINE

(75) Inventor: David C. Wyland, Morgan Hill, CA (US)

(73) Assignee: Cradle Technologies, Inc., Mountain View, CA (US)

( * ) Notice: Subject to any disclaimer, the term of this patent is extended or adjusted under 35 U.S.C. 154(b) by 252 days.

(21) Appl. No.: 10/061,543

(22) Filed: Feb. 1, 2002

Related U.S. Application Data

(60) Provisional application No. 60/266,002, filed on Feb. 2, 2001.

(51) Int. Cl.[7] .............................................. G06F 12/00
(52) U.S. Cl. ...................................................... 711/154
(58) Field of Search ................................. 711/147, 154

(56) References Cited

U.S. PATENT DOCUMENTS

| | | | | |
|---|---|---|---|---|
| 5,043,937 A | * | 8/1991 | Glaise et al. ................ | 711/147 |
| 5,247,643 A | * | 9/1993 | Shottan ....................... | 711/143 |
| 5,652,895 A | | 7/1997 | Poisner ........................ | 395/750 |
| 5,713,029 A | | 1/1998 | Kaiser et al. ................ | 395/750 |
| 6,052,756 A | * | 4/2000 | Barnaby et al. ............ | 711/105 |

FOREIGN PATENT DOCUMENTS

| | | | | |
|---|---|---|---|---|
| JP | 04038550 A | * | 2/1992 | ............ G06F/13/16 |

* cited by examiner

*Primary Examiner*—Kevin Verbrugge
(74) *Attorney, Agent, or Firm*—Thomas Schneck; Nissa Strottman

(57) ABSTRACT

Methods for waking up an idle memory transfer controller (MTC) in response to an event from an external source. The first mechanism, Parameter List Pointer (PLP) FIFO Wake Up, wakes up an MTC after an external agent writes to an MTC's PLP FIFO. This activates the MTC's run bit, making the MTC eligible to execute instructions if chosen to do so by the memory transfer engine arbiter. This mechanism allows the MTC to distinguish between multiple possible originators of multiple possible wake-up events; wake-up events may be queued. Events may be directed to particular MTCs or to the next MTC available to process the event. The second mechanism wakes up an MTC after an external agent writes to an MTC's external wake-up address. This sets the MTC's run bit, making the MTC eligible to execute instructions if chosen to do so by the memory transfer engine arbiter. This approach only recognizes one event and one source. Events may not be queued using this approach.

30 Claims, 6 Drawing Sheets

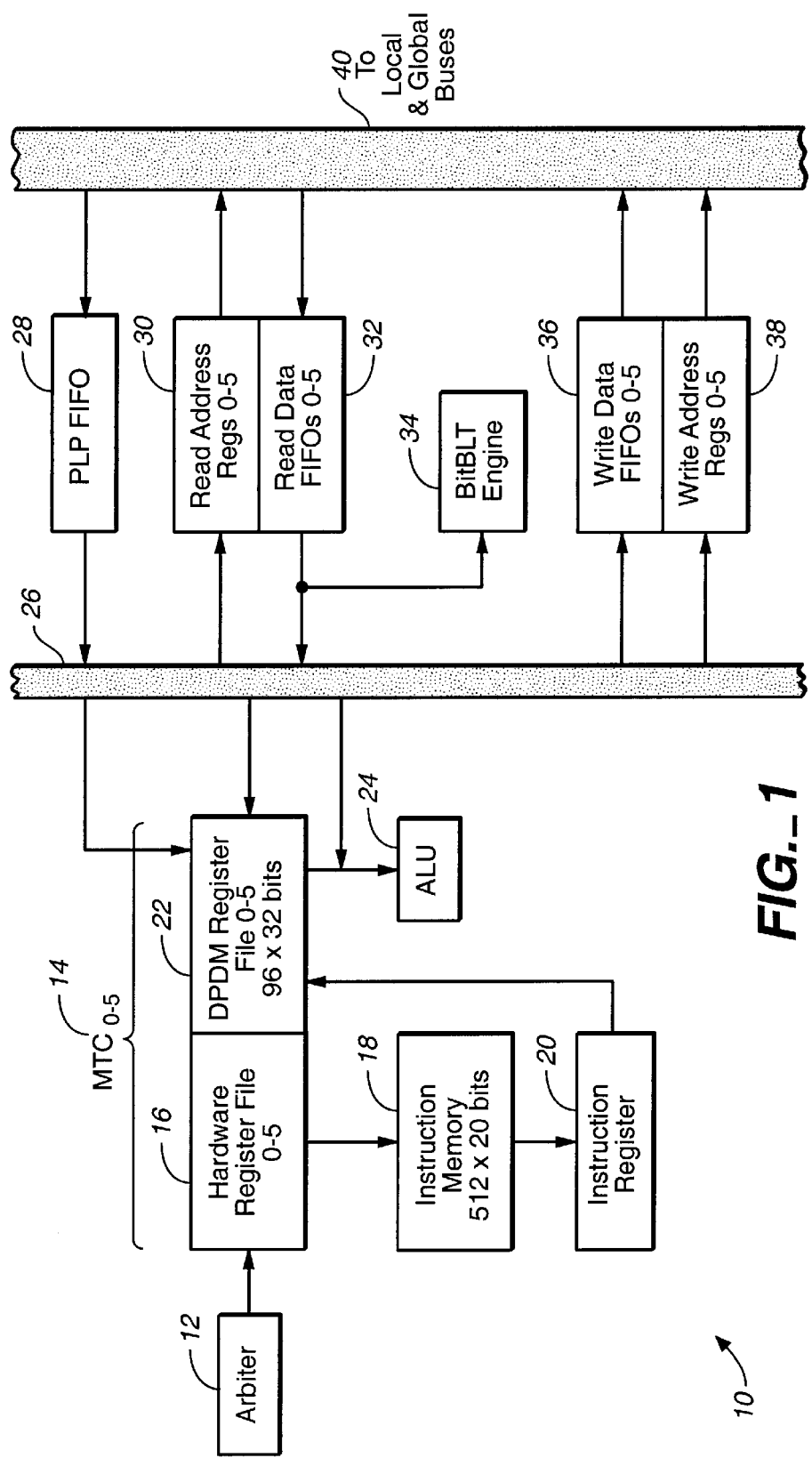
FIG._1

MTC Program Addressable Registers

| Reg | Addr | Name | Type | R/W | Function | Comments |
|---|---|---|---|---|---|---|
| 0-15 | 0-120 | R0-R15 | | RW | Data Registers 0-15 | |
| 16 | 128 | PLP | Com | RO | Parameter List Pointer FIFO | Read Only: Read pops FIFO |
| 17 | 136 | PLT | Com | RO | PLP FIFO tag bits | Read Only: Address LSBs |
| 18 | 144 | PEEKL | | RO | Read FIFO Peek, low 32 Bits | |
| 19 | 152 | PEEKH | | RO | Read FIFO Peek, high 32 Bits | |
| 20 | 160 | BBC | | RW | BitBLT Byte Counter | 24 bits |
| 21 | 168 | PXL | | RW | BitBLT Pixel Fill register | 32-bit pixel fill |
| 22 | 176 | | | RO | Reserved | |
| 23 | 184 | SINC | | RO | Source Increment | BitBLT Address increments |
| 24 | 192 | DINC | | RO | Destination Increment | BitBLT Address increments |
| 25 | 200 | RSD | Com | RW | RS Result | |
| 26 | 208 | MX | | RW | MTC select for indexed access | MTC H/W regs map to 112-127 |
| 27 | 216 | CA | | R-W | Quad Base Addr & MTC Offset | Write = XW Set Run |
| 28 | 224 | MEM | | RW | Read FIFO, Write FIFO | Each MTC has one of each |
| 29 | 232 | LC | | RW | Loop Counters | 12 Bits |
| 30 | 240 | RA | | RO | JSR Return Addresses | Read Only |
| 31 | 248 | PSW | | RW | MTC PSW | Read while running |

FIG._2

MTC PSW Bit Assignments

| Reg | Addr | Name | Type | R/W | Function | Comments |
|---|---|---|---|---|---|---|
| 0-15 | 0-120 | R0-R15 | | RW | Data Registers 0-15 | |
| 16 | 128 | PLP | Com | RO | Parameter List Pointer FIFO | Read Only: Read pops FIFO |
| 17 | 136 | PLT | Com | RO | PLP FIFO tag bits | Read Only: Address LSBs |
| 18 | 144 | PEEKL | | RO | Read FIFO Peek, low 32 bits | |
| 19 | 152 | PEEKH | | RO | Read FIFO Peek, high 32 bits | |
| 20 | 160 | BBC | | RW | BitBLT Byte Counter | 24 bits |
| 21 | 168 | PXL | | RW | BitBLT Pixel Fill register | 32-bit pixel fill |
| 22 | 176 | | | RO | reserved | |
| 23 | 184 | SINC | | RO | Source Increment | BitBLT Address increments |
| 24 | 192 | DINC | | RO | Destination Increment | BitBLT Address increments |
| 25 | 200 | RSD | Com | RW | RS Result | |
| 26 | 208 | MX | | RW | MTC select for indexed access | MTC H/W regs map to 112-127 |
| 27 | 216 | CA | | R-W | Quad Base Addr & MTC Offset | Write = XW Set Run |
| 28 | 224 | MEM | | RW | Read FIFO, Write FIFO | Each MTC has one of each |
| 29 | 232 | LC | | RW | Loop Counters | 12 bits |
| 30 | 240 | RA | | RO | JSR Return Addresses | Read Only |
| 31 | 248 | PSW | | RW | MTC PSW | Read while running |

FIG._3

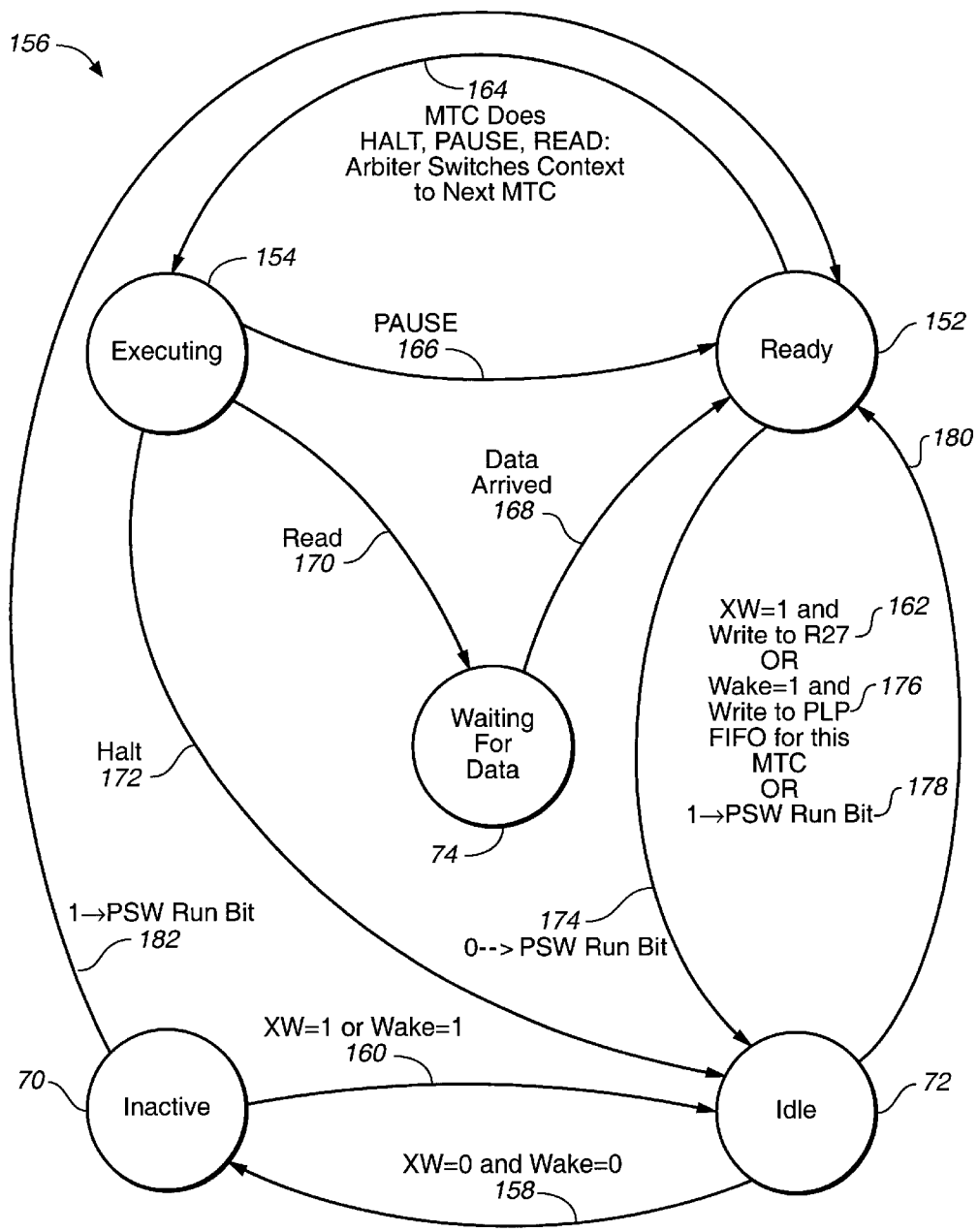
FIG._4

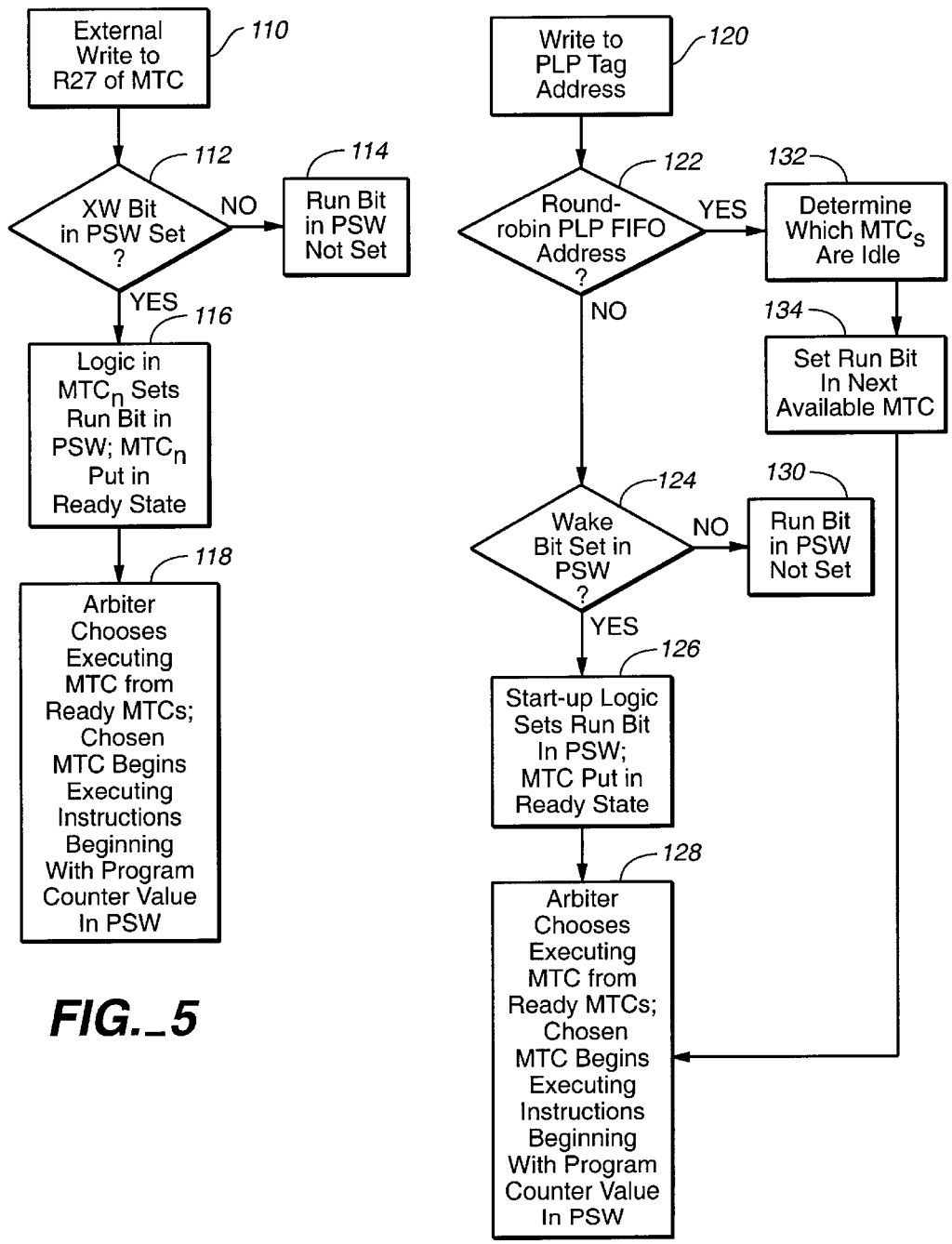
FIG._5
FIG._6

**MTC Start-up Address Map:
External Wake-up**

| GB Address | Register Address | Function |
|---|---|---|
| 216 | R27 | $MTC_0$ External Wake-up Address |
| 472 | R27 | $MTC_1$ External Wake-up Address |
| 728 | R27 | $MTC_2$ External Wake-up Address |
| 984 | R27 | $MTC_3$ External Wake-up Address |
| 1240 | R27 | $MTC_4$ External Wake-up Address |
| 1496 | R27 | $MTC_5$ External Wake-up Address |

*FIG._7a*

**MTC Start-up Address Map:
PLP FIFO Start-up**

| GB Address | PLP Control | Function |
|---|---|---|
| 1536-1791 | Semaphore | Round-robin |
| 1792 | Hardware | $MTC_0$ Start-up |
| 1824 | Hardware | $MTC_1$ Start-up |
| 1856 | Hardware | $MTC_2$ Start-up |
| 1888 | Hardware | $MTC_3$ Start-up |
| 1920 | Hardware | $MTC_4$ Start-up |
| 1952 | Hardware | $MTC_5$ Start-up |

*FIG._7b*

PROGRAMMABLE WAKE UP OF MEMORY TRANSFER CONTROLLERS IN A MEMORY TRANSFER ENGINE

CROSS-REFERENCE TO RELATED APPLICATION

This application claims the benefit of U.S. provisional application Ser. No. 60/266,002, filed Feb. 2, 2001.

FIELD OF THE INVENTION

This invention relates to memory transfer engines in semiconductor chips.

BACKGROUND OF THE INVENTION

As the demand for faster microprocessors increases, there is a need for decreasing data processing latency. One of the ways this is done is by employing split read transactions, where reading data is split into two different actions—requesting a read and providing the requested data. The split transaction allows the processor to perform other tasks while the requested data is being fetched, thus reducing processing latency.

In a memory transfer engine having a plurality of memory transfer controllers (MTCs) for transferring data to memory, a processor may be shared among the various MTCs. If split read transactions are employed, the processor can request data for at least one MTC and perform at least one other task for another MTC while the requested data is fetched. Such an arrangement increases the data bandwidth of the system.

If the above arrangement is employed, it is necessary to have both a hardware context-switching system for switching the processor to another MTC and a notification system for waking up inactive MTCs in order for the system to operate efficiently. It is an object of this invention to provide a mechanism for waking up an idle MTC in response to notification of an event from an external source.

SUMMARY OF THE INVENTION

A semiconductor chip's memory transfer engine (MTE) consists of a plurality of memory transfer controllers (MTCs), each MTC having direct access to its associated plurality of dual port data memory (DPDM) registers and hardware registers. Each MTC can also access the DPDM registers and hardware registers associated with the other MTCs in the MTE.

The MTE has one hardware processor which is shared among the MTCs in a round-robin, time-sliced manner. When an executing MTC relinquishes control of the processor, an arbiter chooses the next MTC to control the processor from the MTCs that are ready to execute an instruction.

Two wake-up mechanisms are available to make an idle MTC ready to execute in response to a wake-up event from an external source, thus facilitating event-driven multi-threading of the MTCs in an MTE.

The first mechanism, Parameter List Pointer (PLP) FIFO wakeup, wakes up an MTC after an external agent writes to an MTC's PLP FIFO. This activates the MTC's run bit, placing the MTC in a state where it can execute instructions. This mechanism allows the MTC to distinguish between multiple possible originators of multiple possible wake-up events. Wake-up events may be queued. Events may be directed to particular MTCs or to the next MTC available to process the event.

The second mechanism wakes up an MTC after an external agent writes to an MTC's external wake-up address. This activates the MTC's run bit. This approach only recognizes one event and one source. Events may not be queued using this approach.

BRIEF DESCRIPTION OF THE DRAWINGS

FIG. 1 is a block diagram showing the memory transfer engine.

FIG. 2 is an example of a register map of a memory transfer controller in the memory transfer engine shown in FIG. 1.

FIG. 3 is a chart showing processor status word bit assignments for a memory transfer controller in the memory transfer engine shown in FIG. 1.

FIG. 4 is a state diagram showing various states of a memory transfer controller in the memory transfer engine shown in FIG. 1.

FIG. 5 is a flow chart showing a first wake-up mechanism for a memory transfer controller in the memory transfer engine shown in FIG. 1.

FIG. 6 is a flow chart showing a second wake-up mechanism for a memory transfer controller in the memory transfer engine shown in FIG. 1.

FIG. 7a is a chart showing memory transfer controller start-up addresses for a wake-up mechanism shown in FIG. 5.

FIG. 7b is a flow chart showing memory transfer controller start-up addresses for a wake-up mechanism shown in FIG. 6.

BEST MODE FOR CARRYING OUT THE INVENTION

With respect to FIG. 1, in this embodiment the wake-up mechanisms are employed in a memory transfer engine (MTE) 10, which consists of six memory transfer controllers (MTCs) 14 which move blocks of data from a source address to a destination address. (In this embodiment, the chip containing the MTE is a UMS0103, a multiprocessor manufactured by Cradle Technologies, Inc. However, the invention could be used in any system where there are multiple memory transfer controllers.) Each of the MTCs 14 has direct access to its own group of 16 dual port memory data (DPDM) registers 22 (in this embodiment, 96×32 bits) and 16 hardware registers 16. Each MTC 14 can write to the DPDM registers 22 and hardware registers 16 associated with the other five MTCs 14. The MTCs 14 share the MTE's 10 hardware processor in a round-robin, time-sliced manner. No more than one MTC 14 executes an instruction at any one time; however, more than one MTC 14 may be active at any given time (i.e., waiting for data) (see FIG. 4, below). Each MTC 14 performs one task, such as transferring data, then relinquishes control of the processor to another MTC 14. An arbiter 12 chooses the next MTC 14 to execute an instruction. As will be shown below in FIGS. 5 and 6, there are two mechanisms which may be used to make an idle MTC ready to execute in response to a wake-up event from an external source.

Each of the MTCs 14 has its own Read FIFO 32 and Write FIFO 36 which operate independently from the other MTCs 14 Read and Write FIFOS 32, 36. Each MTC 13 also has its own Read Address Register 30 and Write Address Register 38, which are associated with the Read and Write FIFOS 32, 36.

The MTE 10 reads data in a split transaction. When an MTC 14 executes a READ instruction, the instruction writes the memory address into its associated Read Address Register 30. The read data is subsequently put into the MTC's 14 Read FIFO. When an MTC 14 executes a WRITE instruction, the data and address are each written into the Write FIFO 32 and the Write Address Register 38, respectively. The Write FIFO 32 logic writes the data into memory at the next available memory cycle.

The MTE 10 also has a bit block transfer (BitBLT) engine 34 which does byte alignment of data transfers on the fly. It takes an input stream from the Read FIFO 32 and generates the output stream into the Write FIFO 36. The MTC 14 sets up the FIFOS 32, 36 for the transfer and the BitBLT engine 34 moves the data.

The parameter list pointer (PLP) FIFO 28 is the command input FIFO for the MTE 10. Commands are issued to the MTE 10 by writing the address of a parameter block into the PLP FIFO 28. The PLP FIFO 28 occupies a global address range of 512 bytes and is 32 words deep. Writing to any address within its address range writes data to the PLP register (described below in FIG. 2). Interpretation of the PLP FIFO's 28 contents is done by MTE 10 firmware. As discussed below in FIGS. 2 and 6, the PLP FIFO is central to one of the MTC wake-up mechanisms.

Instructions to be executed are fetched from the MTE's 10 instruction memory 18 (in this embodiment, 512×20 bits) and placed in the instruction register 20. The MTE's 10 Arithmetic Logic Unit 24 performs Boolean operations as well as addition, subtraction, and multiplication of integers.

With respect to FIG. 2, the MTC's program-addressable registers include data registers and hardware registers. A possible configuration of these registers is shown in the table 42, including the register number 44, the address 46, the name of the register 48, the type of the register, the read/write capacity of the register 52, the register's function 54, and comments about the register 56. Some registers of particular interest for purposes of this invention are the PLP register 58, the parameter list tag (PLT) register 60, the CA register 68, in this embodiment, the Quad (a cluster of processors and memory) address register, and the Processor Status Word (PSW) register 66, which shows the MTC processor operation.

The PLP FIFO was described above in FIG. 1. Referring again to FIG. 2, when data is written to PLP register 58, a 9-bit address code or tag is also written to an extension of the PLP FIFO, the PLP FIFO tag. The 9-bit address code of the PLP FIFO tag indicates which address in the PLP FIFO's global address range was used. The MTE firmware can use this address code, or tag, by reading the Parameter List Tag (PLT) register 60. The MTE firmware can use this tag to select other MTE functions and other interpretations of the PLP FIFO contents.

CA register 68 serves two purposes. When read, it returns the global address of the MTC. When written it serves as the external wake-up address of the MTC (see FIG. 5, below).

The PSW register 66 shows MTC processor operation. With reference to FIG. 3, the table 76 shows MTC PSW bit assignments, including the bit 78, the name of the bit 80, whether the bits may be modified by an external write to the PSW's GBus address while the MTC is not running 82 or when it is running 84. The table 76 also indicates which bits may be modified by an instruction running on the MTC 86. The function 88 of each bit is also given. For this invention, bits of particular interest are: the MTC run bit 102; the wake-up bit 90; the external wake-up bit 92; the enable bit 96; the waiting-for-data bit 94; and the MTC program counter 104.

The run 102 bit helps control the MTC clock. When the run bit 102 is one, the MTC clock runs and the MTC executes instructions. When the run bit 102 is zero, the MTC clock is stopped and the MTC is stalled.

The wake-up bit 90 enables the MTC to automatically wake up when the PLP FIFO is not empty. The PLP FIFO not empty flag may set the run bit 102 in the PSW. If the wake-up bit 90 is set and the MTC Run bit 102 is cleared, the MTC run bit 102 will be set whenever the PLP FIFO empty flag goes inactive (i.e., when it has received one or more parameter list addresses). Clearing the empty flag activates the MTC start-up logic.

The External WakeUp (XW) bit 92 enables the MTC to automatically wake up in response to an external write to register 27 (see FIG. 2, number 68) of the MTC in question. Register 27 is the Quad address register. If the XW bit 92 is set and the run bit 102 in the PSW is cleared, an external write to register 27 will set the run bit 102. The contents of register 27, the Quad address register, are unmodified by the write.

The enable bit 96 enables the MTC to participate in arbitration (the selection of which MTC will next execute an instruction). This bit is set and cleared by enable and pause instructions. The enable bit 96 also controls start up. Writing to the first 256 addresses of the PLP FIFO will start an MTC as long as at least one MTC PSW has its enable bit 96 set. Writing to the upper 256 bits requires the enable bit 96 in the appropriate MTC PSW be set in order for it to start up as a result of the write.

The waiting-for-data (WFD) bit 94 is set if the MTC is waiting for data after a READ or cyclic redundancy check instruction is executed. When a READ instruction is initiated, the MTC must wait for the data to arrive. The READ instruction sets the WFD bit 94 and causes the arbiter to select the next MTC to execute an instruction. When the data for an MTC arrives in the read FIFO, the WFD bit 94 is cleared, allowing the MTC to be selected by the arbiter, which only selects MTCs in the Ready state.

The MTC program counter 104 holds the address of the next instruction to be executed by its associated MTC. MTE execution logic uses the program counter 104 to access MTE instruction memory and read the next instruction while the current instruction is executed.

As shown in FIG. 4, an MTC can be in one of 5 states: executing 154, waiting for data 74, ready 152, idle 72, and inactive 70. If an MTC is in the executing 154, waiting for data 74, or ready state 152, the run bit is set to "1." If the wake-up bit is set to "1" and the run bit is "0," the MTC is idle 72 (however, as mentioned above, it will become ready if a wake-up event occurs). If the MTC's run bit is "0" and the wake-up bit is also "0," the MTC is inactive 70 and no task is assigned to it.

An executing MTC relinquishes control of the processor when it executes a READ, HALT, or PAUSE instruction 164. The arbiter then places the next ready MTC in an executing state 154.

As noted above, there are two mechanisms, External Wake Up and PLP FIFO Wake Up, which may be used to make an idle MTC ready to execute in response to a wake-up event from an external source. (Another mechanism for making an MTC ready 152 is to set the run bit to "1" via an external write. This can be done to make 178 an idle 72 MTC ready 152 or to make an inactive 70 MTC ready 152.) These two mechanisms, described below, facilitate event-driven multithreading of the six MTCs in the MTE.

In External Wake Up, only one event type and source is supported and events cannot be queued. However, in PLP FIFO Wake Ups, the value retrieved from the PLP FIFO defines the event type, while the value read from the PLP Tag FIFO defines the event originator. As many as 32 events may be queued in the FIFOS. Typically, only one of the wake-up mechanisms is employed at any given time.

As shown in FIG. 5, External Wake Up may occur when there is an external write to register 27 of $MTC_N$ (block 110). If the XW bit in the PSW is set (block 112), the MTC's logic sets the run bit in the PSW to "1" (block 116). When the run bit is set, the MTC is ready and eligible to be made executing in the next arbitration round. If the MTC is chosen, it begins to execute instructions starting with the program counter value in the PSW (block 118). However, if the XW bit in the PSW is "0," the run bit in the PSW may not be set by an external write to register 27. An MTC does not have to be idle at the time the external write is performed.

With reference to FIG. 6, PLP FIFO Wake Up may occur after writing to an MTC's PLP FIFO address (block 120). (As with External Wake Up, an MTC does not have to be idle when the external write occurs.) If the PLP FIFO address identifies a specific MTC (block 122), and the wake-up bit in the PSW is set (block 124), the start-up logic sets the run bit in the PSW (block 126). The MTC is thus placed in ready state and is eligible to be made executing during the next arbitration round. If the MTC is chosen by the arbiter, it begins to execute instructions starting with the program counter value in the PSW (block 128). If the wake-up bit in the PSW is not set, the run bit in the PSW cannot be set by writing to the PLP tag address (block 130).

If the PLP FIFO address does not identify a specific MTC, but instead is a round-robin address (see below in FIG. 7b) (block 122), the round-robin start-up logic is activated. The round-robin start-up logic determines which MTCs are idle (i.e., have their wake-up bits but not their run bits set) (block 132) and sets the run bit in the next available MTC in a round-robin fashion (block 134). The MTC is now ready and eligible to be made executing during the next arbitration round; if the MTC is chosen, it begins to execute instructions starting with the program counter value in the PSW (block 128).

Referring again to FIG. 4, the diagram 156 summarizes the various states of an MTC and the corresponding status of the wake-up bit, the XW bit, and the run bit in the MTC with regard to the two wake-up mechanisms discussed above. When an MTC is inactive 70, either the wake-up bit or the XW bit is "0" 158. If an MTC is idle 72, either the wake-up bit or the XW bit is "1" 160 while the run bit is "0" 174. In order for the MTC to become ready 152 via a wake-up mechanism, two things could happen. If the XW bit is "1" and register 27 is written to 162, the run bit is changed to "1" and the MTC becomes ready 152. If the wake-up bit is "1" and the MTC's PLP register is written to 176, the run bit is changed to "1" and the MTC will move from idle 72 to ready state 152.

Once the MTC is ready 152, it is eligible to be made executing during the next arbitration round. If the MTC executes 154 a HALT, PAUSE, or READ instruction, the MTE Arbiter switches to another MTC 164. If the MTC executes a READ instruction 170, the MTC has to wait for data 74. Once the data arrives 168, the MTC returns to the ready state 152. If the MTC executes a PAUSE instruction 166, the MTC goes from the executing state 154 to the ready state 152. When a HALT instruction is executed 172, the run bit is set to "0" and the MTC returns to the idle state 72.

In FIG. 7a, the table 136 indicates the global bus addresses 138 for each MTC's register 27 140. Each of these addresses serves as the external wake-up address 142 for the corresponding MTC.

In FIG. 7b, the table 144 indicates the global bus addresses 146 for each of the MTC's PLP FIFOS (including the round-robin addresses). The PLP control 148 for each of these addresses is also indicated.

What is claimed is:

1. In a semiconductor chip, a method of waking up an idle memory transfer controller in response to an event from an external source, said method comprising:
   a) writing to at least one hardware register of a memory transfer engine including a plurality of memory transfer controllers, said writing performed by an external agent; and
   b) activating an idle memory transfer controller so that it can execute instructions, said activation enabled by the writing step.

2. The method of claim 1 further including selecting a memory transfer controller to activate.

3. The method of claim 1 wherein the writing step identifies a specific memory transfer controller to be activated.

4. The method of claim 1 wherein the writing step does not specify which memory transfer controller is to be activated.

5. The method of claim 4 wherein the memory transfer controller to be activated is chosen in round-robin fashion.

6. The method of claim 1 wherein the activating step includes setting a run bit of the memory transfer controller.

7. The method of claim 4 further including a selection step, wherein one of the plurality of memory transfer controllers is chosen to execute an instruction.

8. The method of claim 1 wherein the hardware register is an external wake-up register.

9. The method of claim 1 wherein the hardware register is a command input buffer for the memory transfer engine.

10. The method of claim 1 wherein the activating step is performed by memory transfer controller start logic.

11. The method of claim 1 wherein at least one of the plurality of memory transfer controllers is idle when the writing step occurs.

12. The method of claim 1 wherein none of the plurality of memory transfer controllers is idle when the writing step occurs.

13. The method of claim 12 wherein the activating step occurs after a memory transfer controller becomes idle.

14. In a semiconductor chip, a method of causing an idle memory transfer controller to execute instructions in response to an event from an external source, said method comprising:
   a) writing to at least one hardware register of a memory transfer engine including a plurality of memory transfer controllers, said writing performed by an external agent;
   b) setting a first bit in an idle memory transfer controller, thereby activating said memory transfer controller; and
   c) executing instructions.

15. The method of claim 14 wherein the hardware register is a command input buffer of the memory transfer engine.

16. The method of claim 14 wherein the hardware register is an external wake-up register.

17. The method of claim 14 wherein the external agent writes to two hardware registers of the memory transfer engine.

18. The method of claim 15 wherein a value written to the command input buffer defines an event type.

19. The method of claim 15 wherein a value written to a second hardware register defines an event originator.

20. The method of claim 15 wherein a plurality of values may be queued in the command input buffer, said values defining a plurality of events.

21. The method of claim 14 wherein at least one of the plurality of memory transfer controllers is idle when the writing step occurs.

22. The method of claim 14 wherein none of the plurality of memory transfer controllers is idle when the writing step occurs.

23. The method of claim 22 wherein the activating step occurs after a memory transfer controller becomes idle.

24. In a semiconductor chip, a method of operating a memory transfer engine including a plurality of memory transfer controllers and a shared processor in an event-driven fashion, said method comprising:
   a) executing initialization code with the processor;
   b) stopping the executing memory transfer controller such that the processor is surrendered by said executing memory transfer controller;
   c) writing to a hardware register of a memory transfer engine, said writing performed by an external agent, wherein the value written to the hardware register identifies an event type; and
   d) activating an idle memory transfer controller so that it can execute instructions with the processor, said activation enabled by the writing step.

25. The method of claim 24 further including a selection step, wherein one of the plurality of memory transfer controllers is chosen to be activated.

26. The method of claim 24 wherein the writing step identifies a specific memory transfer controller to be activated.

27. The method of claim 24 wherein the writing step does not identify a specific memory transfer controller to be activated.

28. The method of claim 24 wherein at least one of the plurality of memory transfer controllers is idle when the writing step occurs.

29. The method of claim 24 wherein none of the plurality of memory transfer controllers is idle when the writing step occurs.

30. The method of claim 29 wherein the activating step occurs after a memory transfer controller becomes idle.

* * * * *